United States Patent
Guo et al.

(10) Patent No.: US 11,943,811 B2
(45) Date of Patent: Mar. 26, 2024

(54) INFORMATION INDICATION METHOD AND COMMUNICATION APPARATUS

(71) Applicant: Huawei Technologies Co., Ltd., Shenzhen (CN)

(72) Inventors: Yuchen Guo, Shenzhen (CN); Ming Gan, Shenzhen (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/354,180

(22) Filed: Jul. 18, 2023

(65) Prior Publication Data

US 2023/0363001 A1    Nov. 9, 2023

Related U.S. Application Data

(63) Continuation of application No. PCT/CN2022/084096, filed on Mar. 30, 2022.

(30) Foreign Application Priority Data

Apr. 7, 2021   (CN) .......................... 202110375411.9
Apr. 30, 2021  (CN) .......................... 202110485965.4

(51) Int. Cl.
  *H04W 74/08*     (2009.01)
  *H04W 74/0816*   (2024.01)

(52) U.S. Cl.
  CPC ... *H04W 74/0816* (2013.01); *H04W 74/0866* (2013.01)

(58) Field of Classification Search
  CPC ...................... H04W 74/0816; H04W 74/0866
  See application file for complete search history.

(56) References Cited

U.S. PATENT DOCUMENTS

2014/0086200 A1*  3/2014  Seok ..................... H04L 5/0096
                                                           370/330
2016/0021577 A1   1/2016  Du et al.
(Continued)

FOREIGN PATENT DOCUMENTS

CN        1902973 A      1/2007
CN      106656407 A      5/2017
(Continued)

OTHER PUBLICATIONS

3GPP TS 27.060 V3.3.0 (Jan. 2000), 3rd Generation Partnership Project; Technical Specification Group Core Network; Packet Domain; Mobile Station (MS) supporting Packet Switched Services(3G TS 27.060 version 3.3.0 Release 1999), 49 pages.
(Continued)

*Primary Examiner* — Kashif Siddiqui
(74) *Attorney, Agent, or Firm* — Slater Matsil, LLP

(57) ABSTRACT

A non-AP MLD or a first STA in the non-AP MLD generates a first frame. The first frame includes indication information for indicating padding duration for a channel switch delay in an initial control frame. The padding duration is determined based on duration of a control response frame. The non-AP MLD or the first STA or another STA in the non-AP MLD transmits the first frame. An AP MLD or a first AP or another AP in the AP MLD receives the first frame. The AP MLD or the first AP determines the padding duration of the initial control frame based on the indication information.

21 Claims, 11 Drawing Sheets

(56) References Cited

U.S. PATENT DOCUMENTS

| | | | | |
|---|---|---|---|---|
| 2016/0352470 | A1* | 12/2016 | Kubo | H04L 1/1883 |
| 2020/0163141 | A1* | 5/2020 | Hsu | H04W 52/0209 |
| 2021/0007168 | A1 | 1/2021 | Asterjadhi et al. | |
| 2021/0136817 | A1* | 5/2021 | Wang | H04W 74/085 |
| 2021/0315025 | A1* | 10/2021 | Seok | H04L 1/0008 |
| 2021/0377928 | A1* | 12/2021 | Seok | H04W 72/046 |
| 2021/0378039 | A1* | 12/2021 | Cherian | H04W 8/24 |
| 2022/0104261 | A1* | 3/2022 | Kwon | H04W 74/0816 |

FOREIGN PATENT DOCUMENTS

| | | |
|---|---|---|
| CN | 108011688 A | 5/2018 |
| CN | 108029127 A | 5/2018 |
| CN | 109600320 A | 4/2019 |
| CN | 109644518 A | 4/2019 |
| CN | 110224875 A | 9/2019 |
| CN | 111669204 A | 9/2020 |
| CN | 111726203 A | 9/2020 |
| CN | 112188644 A | 1/2021 |
| CN | 112449391 A | 3/2021 |
| WO | 2021003181 A1 | 1/2021 |

OTHER PUBLICATIONS

ETRI, "Synchronized Handover for Latency Reduction", 3GPP TSG-RAN WG2 #92, R2-156412, Anaheim, CA, US, Nov. 16-20, 2015, 26 pages.

IEEE P802.11be/D0.1, Sep. 2020, Draft Standard for Information technology-Tele-communications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), 299 pages.

Kwon, Young Hoon, "Proposed Draft Text MAC MLO EMLMR TBDs", doc.: IEEE 802.11-21/0335r12, Feb. 26, 2021, 7 pages.

* cited by examiner

| Frame control | Duration | Address 1 | Address 2 | Address 3 | Sequence control | Address 4 | Quality of service control | High throughput control | Frame check sequence |
|---|---|---|---|---|---|---|---|---|---|
| 2 | 2 | 6 | 6 | 6 | 2 | 0 or 6 | 2 | 4 | 4 |

Bytes

FIG. 7

INFORMATION INDICATION METHOD AND COMMUNICATION APPARATUS

CROSS-REFERENCE TO RELATED APPLICATIONS

This application is a continuation of International Application No. PCT/CN2022/084096, filed on Mar. 30, 2022, which claims priority to Chinese Patent Application No. 202110485965.4, filed on Apr. 30, 2021 and Chinese Patent Application No. 202110375411.9, filed on Apr. 7, 2021. All of the aforementioned patent applications are hereby incorporated by reference in their entireties.

TECHNICAL FIELD

This application relates to the field of wireless communication technologies, and in particular, to an information indication method and a communication apparatus.

BACKGROUND

With development of wireless technologies, increasingly more wireless devices support multi-link communication. A non-access point multi-link device (non-AP MLD) may monitor multiple links. After an initial control frame sent to the non-AP MLD or a non-access point station (non-AP STA) in the non-AP MLD is received by the non-AP MLD or the non-AP STA on a link, a receive channel (receive chain) on another link may be switched to the link, so that after the initial control frame is received, a data frame may be received at a higher rate.

FIG. 1 is a schematic diagram of a transmission channel switching process. When a quantity of receive channels of a non-AP MLD on a link is switched from A to B (B>A, and in FIG. 1, the quantity of receive channels is switched from 1 to 2), certain time is required. Therefore, an access point multi-link device (AP MLD) or an access point (AP) in an AP MLD needs to add padding bits to a sent initial control frame, so that there is enough time to switch the receive channel after the non-AP MLD receives the initial control frame. After receiving a content portion of the initial control frame, the non-AP MLD may start to perform switching, as long as the switching is completed before a subsequent data frame arrives. When a switch delay required by the non-AP MLD is longer, more padding bits need to be added to the initial control frame.

When the AP MLD or the AP in the AP MLD sends the initial control frame, padding duration needs to be determined, so that the non-AP MLD can complete switching of a quantity of transmission channels before the subsequent data frame arrives. However, there is currently no corresponding solution to determine the padding duration.

SUMMARY

This application provides an information indication method and a communication apparatus, to accurately determine padding duration of an initial control frame, so that a non-AP MLD can complete switching of a quantity of transmission channels before a subsequent data frame arrives.

According to a first aspect, an information indication method is provided. The method includes: A non-AP MLD or a first STA in the non-AP MLD generates a first frame, where the first frame includes indication information, the indication information indicates padding duration for a channel switch delay in an initial control frame, and the padding duration is determined based on duration of a control response frame; and the non-AP MLD or the first STA or another STA in the non-AP MLD transmits the first frame. In this aspect, the padding duration of the initial control frame may be accurately determined, so that the first STA can complete switching of a corresponding quantity of transmission channels before a subsequent data frame arrives.

In a possible implementation, the indication information is carried in an enhanced multi-link single-radio delay field of the first frame and/or an enhanced multi-link multi-radio delay field of the first frame.

In another possible implementation, the first frame includes a plurality of pieces of indication information. Each of the plurality of pieces of indication information indicates padding duration of the initial control frame corresponding to a transmission rate of the initial control frame. In this implementation, the non-AP MLD or the non-AP STA may send the plurality of pieces of indication information to an AP MLD or an AP. Each piece of indication information indicates the padding duration of the initial control frame corresponding to the transmission rate of the initial control frame. The AP MLD or the AP may determine the corresponding padding duration of the initial control frame based on the actual transmission rate of the initial control frame.

In another possible implementation, the method further includes: The non-AP MLD or the first STA in the non-AP MLD determines the duration of the control response frame.

In another possible implementation, the method further includes: The non-AP MLD or the first STA in the non-AP MLD determines a minimum value of the duration of the control response frame. In this implementation, the minimum value of the duration of the control response frame is minimum duration of the control response frame. The non-AP MLD or the first STA determines the minimum value of the duration of the control response frame. Therefore, a maximum value of the padding duration of the initial control frame may be determined, and the delay required for switching the corresponding quantity of transmission channels of the first STA may be satisfied.

In another possible implementation, the determining the duration of the control response frame includes: The non-AP MLD or the first STA in the non-AP MLD determines a rate of the control response frame; and the non-AP MLD or the first STA in the non-AP MLD determines the duration of the control response frame based on the rate of the control response frame and a length of the control response frame. In this implementation, the length of the control response frame is associated with a format of the control response frame, where the duration of the control response frame=length of the control response frame/rate of the control response frame.

In another possible implementation, the determining a minimum value of the duration of the control response frame includes: The non-AP MLD or the first STA in the non-AP MLD determines a maximum value of the rate of the control response frame; and the non-AP MLD or the first STA in the non-AP MLD determines the minimum value of the duration of the control response frame based on the maximum value of the rate of the control response frame and the length of the control response frame. In this implementation, the length of the control response frame is associated with the format of the control response frame, where the minimum value of the duration of the control response frame=length of the control response frame/maximum value of the rate of the control response frame.

In another possible implementation, the maximum value of the rate of the control response frame is a highest rate that is in a basic service set basic rate set and that is less than or equal to a maximum rate of the initial control frame. In this implementation, the basic service set basic rate set includes one or more basic rates that can be supported by the first STA. The maximum value of the rate of the control response frame is the highest rate that is in the basic service set basic rate set and that is less than or equal to the maximum rate of the initial control frame. Therefore, the minimum value of the duration of the control response frame may be obtained based on the maximum value of the rate of the control response frame, and a minimum value of the padding duration of the initial control frame may be determined. The maximum rate of the initial control frame is a variable.

In another possible implementation, if a maximum rate of the initial control frame is 24 Mbps, the maximum value of the rate of the control response frame is a smaller value between 24 Mbps and a highest rate in a basic service set basic rate set. In this implementation, the maximum rate of the initial control frame may be fixed at 24 Mbps. The basic service set basic rate set includes one or more basic rates that can be supported by the first STA. The maximum value of the rate of the control response frame is the highest rate that is in the basic service set basic rate set and that is less than or equal to 24 Mbps. Therefore, the minimum value of the duration of the control response frame may be obtained based on the maximum value of the rate of the control response frame, and a minimum value of the padding duration of the initial control frame may be determined.

In another possible implementation, the padding duration is associated with the switch delay, a first inter-frame space between the initial control frame and the control response frame, a second inter-frame space between the control response frame and the data frame, and the duration of the control response frame.

In another possible implementation, the maximum value of the padding duration is associated with the switch delay, a first inter-frame space between the initial control frame and the control response frame, a second inter-frame space between the control response frame and the data frame, and the minimum value of the duration of the control response frame.

In another possible implementation, the padding duration is padding duration required when the initial control frame is transmitted at the maximum rate, or the padding duration is determined based on the maximum rate of the initial control frame, or the padding duration is padding duration required when the initial control frame is transmitted at 24 Mbps, or the padding duration is padding duration required when the initial control frame is transmitted at any rate, or the padding duration is a maximum value of padding duration required when the initial control frame is transmitted at all rates.

According to a second aspect, an information indication method is provided. The method includes: An AP MLD or a first AP or another AP in the AP MLD receives a first frame, where the first frame includes indication information, the indication information indicates padding duration required for a channel switch delay in an initial control frame, and the padding duration is determined based on duration of a control response frame; and the AP MLD or the first AP determines the padding duration of the initial control frame based on the indication information.

In a possible implementation, the indication information is carried in an enhanced multi-link single-radio delay field of the first frame and/or an enhanced multi-link multi-radio delay field of the first frame.

In another possible implementation, the first frame includes a plurality of pieces of indication information. Each of the plurality of pieces of indication information indicates padding duration of the initial control frame corresponding to a transmission rate of the initial control frame. That the first AP determines the padding duration of the initial control frame based on the first frame includes: determining, based on the first frame, the padding duration of the initial control frame corresponding to the transmission rate of the initial control frame.

In another possible implementation, the duration of the control response frame is determined based on a rate of the control response frame and a length of the control response frame.

In another possible implementation, a minimum value of the duration of the control response frame is determined based on a maximum value of a rate of the control response frame and a length of the control response frame.

In another possible implementation, the maximum value of the rate of the control response frame is a highest rate that is in a basic service set basic rate set and that is less than or equal to a maximum rate of the initial control frame.

In another possible implementation, if a maximum rate of the initial control frame is 24 Mbps, the maximum value of the rate of the control response frame is a smaller value between 24 Mbps and a highest rate in a basic service set basic rate set.

In another possible implementation, the padding duration is associated with the switch delay, a first inter-frame space between the initial control frame and the control response frame, a second inter-frame space between the control response frame and a data frame, and the duration of the control response frame.

In another possible implementation, a maximum value of the padding duration is associated with the switch delay, a first inter-frame space between the initial control frame and the control response frame, a second inter-frame space between the control response frame and a data frame, and the minimum value of the duration of the control response frame.

In another possible implementation, the padding duration is padding duration required when the initial control frame is transmitted at the maximum rate, or the padding duration is determined based on the maximum rate of the initial control frame, or the padding duration is padding duration required when the initial control frame is transmitted at 24 Mbps, or the padding duration is padding duration required when the initial control frame is transmitted at any rate, or the padding duration is a maximum value of padding duration required when the initial control frame is transmitted at all rates.

According to a third aspect, an information indication method is provided. The method includes: A non-AP MLD or a first STA in the non-AP MLD generates a first frame, where the first frame includes indication information, and the indication information indicates a delay required for switching a quantity of transmission channels of the first STA from a first value to a second value; and the non-AP MLD or the first STA or another STA in the non-AP MLD transmits the first frame. In this aspect, the non-AP MLD or the first STA in the non-AP MLD indicates a delay required by an AP to switch a corresponding quantity of transmission channels, so that the AP satisfies the delay when setting padding duration of an initial control frame, and the first STA can complete switching of the corresponding quantity of transmission channels before a subsequent data frame arrives.

In a possible implementation, the indication information is carried in an enhanced multi-link single-radio delay field of the first frame and/or an enhanced multi-link multi-radio delay field of the first frame.

According to a fourth aspect, an information indication method is provided. The method includes: An AP MLD or a first AP or another AP in the AP MLD receives a first frame, where the first frame includes indication information, and the indication information indicates a delay required for switching a quantity of transmission channels of a first STA from a first value to a second value; and the first AP determines padding duration of an initial control frame, where the padding duration of the initial control frame is determined based on the delay.

In a possible implementation, the padding duration is associated with the delay, a first inter-frame space between the initial control frame and a control response frame, a second inter-frame space between the control response frame and a data frame, and duration of the control response frame.

In another possible implementation, the duration of the control response frame is associated with a rate of the control response frame.

In another possible implementation, a maximum value of the rate of the control response frame is a highest rate that is in a basic service set basic rate set and that is less than or equal to a rate of the initial control frame.

In another possible implementation, a sum of the padding duration and the first inter-frame space is greater than a processing delay of the initial control frame.

According to a fifth aspect, a communication apparatus is provided. The communication apparatus may implement the information indication method according to the first aspect. For example, the communication apparatus may be a chip, a non-AP MLD, or a non-AP STA in a non-AP MLD. The foregoing method may be implemented by software, hardware, or hardware executing corresponding software.

In a possible implementation, the communication apparatus may include a transceiver unit and a processing unit. The processing unit is configured to generate a first frame. The first frame includes indication information. The indication information indicates padding duration required for a channel switch delay in an initial control frame. The padding duration is determined based on duration of a control response frame. The transceiver unit is configured to transmit the first frame.

Optionally, the processing unit is further configured to determine the duration of the control response frame.

Optionally, the processing unit is further configured to determine a minimum value of the duration of the control response frame.

Optionally, the processing unit is further configured to determine a rate of the control response frame, and determine the duration of the control response frame based on the rate of the control response frame and a length of the control response frame.

Optionally, the processing unit is further configured to determine a maximum value of the rate of the control response frame, and determine the minimum value of the duration of the control response frame based on the maximum value of the rate of the control response frame and the length of the control response frame.

When the communication apparatus is the non-AP MLD, the communication apparatus includes the transceiver unit and the processing unit. When the communication apparatus is the non-AP MLD, the communication apparatus includes the non-AP STA and the processing unit. The transceiver unit is located in the non-AP STA, and a plurality of non-AP STAs may share one processing unit. When the communication apparatus is the non-AP STA in the non-AP MLD, the communication apparatus includes the transceiver unit and the processing unit.

According to a sixth aspect, a communication apparatus is provided. The communication apparatus may implement the information indication method according to the second aspect. For example, the communication apparatus may be a chip, an AP MLD, or an AP in an AP MLD. The foregoing method may be implemented by software, hardware, or hardware executing corresponding software.

In a possible implementation, the communication apparatus may include a transceiver unit and a processing unit. The transceiver unit is configured to receive a first frame. The first frame includes indication information. The indication information indicates padding duration required for a channel switch delay in an initial control frame. The padding duration is determined based on duration of a control response frame. The processing unit is configured to determine the padding duration of the initial control frame based on the indication information.

Optionally, the first frame includes a plurality of pieces of indication information. Each of the plurality of pieces of indication information indicates padding duration of the initial control frame corresponding to a transmission rate of the initial control frame. The processing unit is further configured to determine, based on the first frame, the padding duration of the initial control frame corresponding to the transmission rate of the initial control frame.

When the communication apparatus is the AP MLD, the communication apparatus includes the transceiver unit and the processing unit. When the communication apparatus is the AP MLD, the communication apparatus includes the AP and the processing unit. The transceiver unit is located in the AP, and a plurality of APs may share one processing unit. When the communication apparatus is the AP in the AP MLD, the communication apparatus includes the transceiver unit and the processing unit.

According to a seventh aspect, a communication apparatus is provided. The communication apparatus may implement the information indication method according to the third aspect. For example, the communication apparatus may be a chip, a non-AP MLD, or a non-AP STA in a non-AP MLD. The foregoing method may be implemented by software, hardware, or hardware executing corresponding software.

In a possible implementation, the communication apparatus may include a transceiver unit and a processing unit. The processing unit is configured to generate a first frame. The first frame includes indication information. The indication information indicates a delay required for switching a quantity of transmission channels of a station from a first value to a second value. The transceiver unit is configured to transmit the first frame.

When the communication apparatus is the non-AP MLD, the communication apparatus includes the transceiver unit and the processing unit. When the communication apparatus is the non-AP MLD, the communication apparatus includes the non-AP STA and the processing unit. The transceiver unit is located in the non-AP STA, and a plurality of non-AP STAs may share one processing unit. When the communication apparatus is the non-AP STA in the non-AP MLD, the communication apparatus includes the transceiver unit and the processing unit.

According to an eighth aspect, a communication apparatus is provided. The communication apparatus may implement the information indication method according to the fourth aspect. For example, the communication apparatus may be a chip, an AP MLD, or an AP in an AP MLD. The foregoing method may be implemented by software, hardware, or hardware executing corresponding software.

In another possible implementation, the communication apparatus may include a transceiver unit and a processing unit. The transceiver unit is configured to receive a first frame. The first frame includes indication information. The indication information indicates a delay required for switching a quantity of transmission channels of a station from a first value to a second value. The processing unit is configured to determine padding duration of an initial control frame. The padding duration of the initial control frame is determined based on the delay.

When the communication apparatus is the AP MLD, the communication apparatus includes the transceiver unit and the processing unit. When the communication apparatus is the AP MLD, the communication apparatus includes the AP and the processing unit. The transceiver unit is located in the AP, and a plurality of APs may share one processing unit. When the communication apparatus is the AP in the AP MLD, the communication apparatus includes the transceiver unit and the processing unit.

In a possible implementation, the communication apparatus in the fifth aspect to the eighth aspect includes a processor coupled to a memory. The processor is configured to support the apparatus in performing a corresponding function in the foregoing information indication method. The memory is configured to be coupled to the processor, and stores a program (instructions) necessary for the apparatus and/or data necessary for the apparatus. Optionally, the communication apparatus may further include a communication interface, configured to support communication between the apparatus and another network element. Optionally, the memory may be located inside the communication apparatus, or may be located outside the communication apparatus.

In another possible implementation, the communication apparatus in the fifth aspect to the eighth aspect includes a processor and a transceiver apparatus. The processor is coupled to the transceiver apparatus. The processor is configured to execute a computer program or instructions, to control the transceiver apparatus to receive and send information. When the processor executes the computer program or the instructions, the processor is further configured to implement the foregoing method by using a logic circuit or executing code instructions. The transceiver apparatus may be a transceiver, a transceiver circuit, or an input/output interface, and is configured to receive a signal from a communication apparatus other than the communication apparatus and transmit the signal to the processor, or send a signal from the processor to a communication apparatus other than the communication apparatus. When the communication apparatus is the chip, the transceiver apparatus is a transceiver circuit or an input/output interface.

When the communication apparatus in the fifth aspect to the eighth aspect is a chip, a sending unit may be an output unit, for example, an output circuit or a communication interface, and a receiving unit may be an input unit, for example, an input circuit or a communication interface. When the communication apparatus is a terminal, a sending unit may be a transmitter or a transmitter machine, and a receiving unit may be a receiver or a receiver machine.

According to a ninth aspect, a computer-readable storage medium is provided. The computer-readable storage medium stores a computer program or instructions. When the computer program or instructions are executed, the methods in the foregoing aspects are implemented.

According to a tenth aspect, a computer program product including instructions is provided. When the instructions are run on a communication apparatus, the communication apparatus is enabled to perform the methods in the foregoing aspects.

According to an eleventh aspect, a communication system is provided. The communication system includes the communication apparatus according to the fifth aspect and the communication apparatus according to the sixth aspect.

According to a twelfth aspect, a communication system is provided. The communication system includes the communication apparatus according to the seventh aspect and the communication apparatus according to the eighth aspect.

BRIEF DESCRIPTION OF THE DRAWINGS

FIG. 7 is a schematic diagram of a format of a QoS-Null frame;

DETAILED DESCRIPTION OF ILLUSTRATIVE EMBODIMENTS

The following describes embodiments of this application with reference to the accompanying drawings in embodiments of this application.

The following describes several basic concepts in this application.

Multi-Link Device (MLD)

A multi-link device may simultaneously perform communication on the bands such as 2.4 GHz, 5 GHz, and 6 GHz, or simultaneously perform communication on different channels of a same band. This increases a communication rate between devices.

Figure 2:
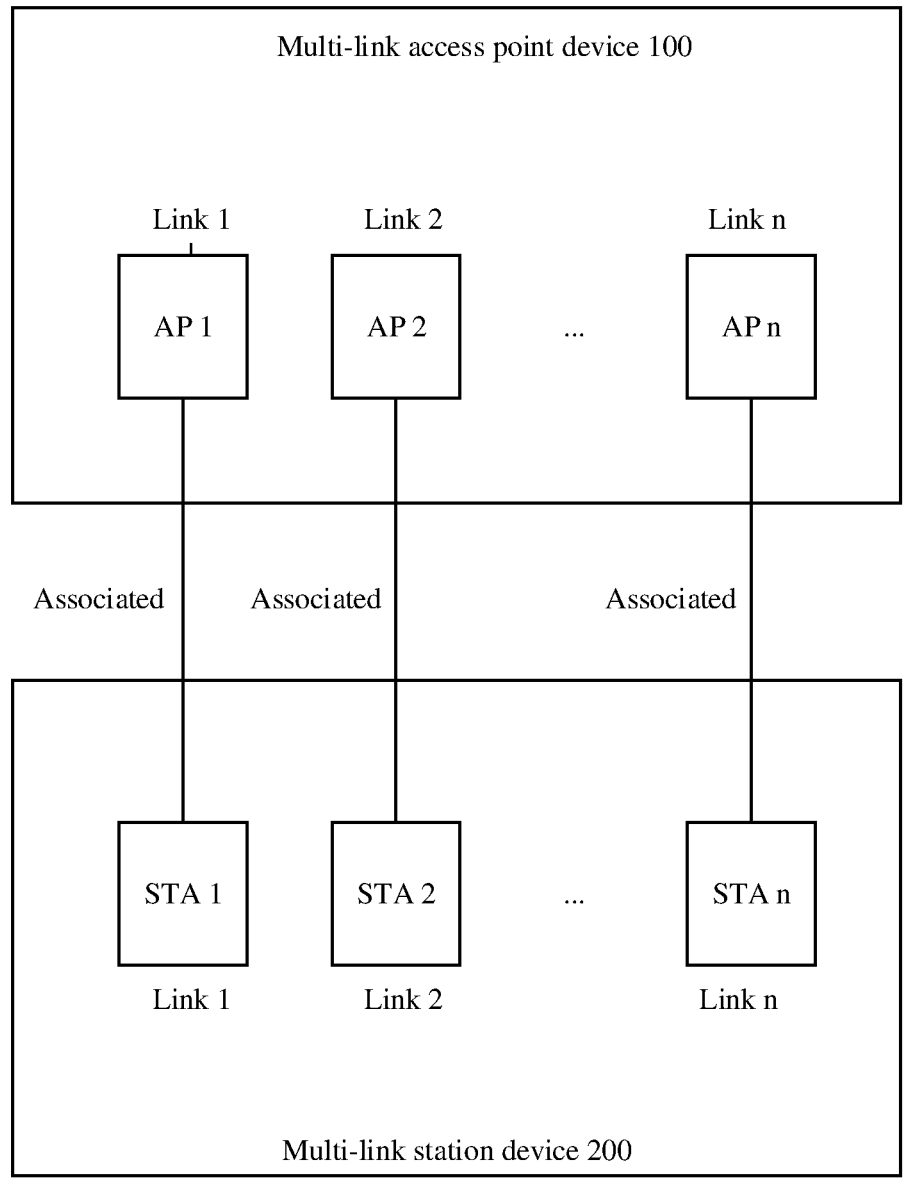
FIG. 2 is a schematic diagram of a multi-link device according to an embodiment of this application.

The multi-link device usually includes a plurality of stations (STAs). Each STA operates on a specific frequency band or channel. FIG. 2 is a schematic diagram of a multi-link device. The multi-link device may be an AP MLD 100, or may be a non-AP MLD 200. If the device is an AP MLD, the device includes one or more APs (for example, an AP 1 to an AP n in the figure), and each STA in the AP MLD is an AP. If the device is a non-AP MLD, the device includes one or more non-AP STAs (for example, a STA 1 to a STA n in the figure), and each STA in the non-AP MLD is a non-AP STA. The one or more non-AP STAs in the non-AP MLD and the one or more APs in the AP MLD may communicate after establishing an association relationship.

In an implementation, each non-AP STA in the non-AP MLD may include a processing unit/processor and a transceiver unit/transceiver. The processing unit/processor may perform processing operations in this application, for example, operations such as generation and determining. The transceiver unit/transceiver is configured to communicate with the AP MLD or an AP that is in the AP MLD and that is associated with the non-AP STA. Therefore, the non-AP STA in the non-AP MLD may perform the processing and receiving and sending operations in this application.

In another implementation, each non-AP STA in the non-AP MLD includes only a transceiver unit/transceiver, the non-AP MLD includes a processing unit/processor, and all non-AP STAs in the non-AP MLD may share the processing unit/processor. Therefore, the non-AP STA in the non-AP MLD may perform the receiving and sending operations in this application, and the non-AP MLD may perform the processing operations in this application.

In another implementation, the non-AP MLD may include a processing unit/processor and a transceiver unit/transceiver. The processing unit/processor may perform processing operations in this application, for example, operations such as generation and determining. The transceiver unit/transceiver is configured to communicate with the AP MLD. Therefore, the non-AP MLD may perform the processing and receiving and sending operations in this application.

For clear and brief description, this application is described by using an example in which the non-AP STA in the non-AP MLD performs the processing and receiving and sending operations in this application.

In an implementation, each AP in the AP MLD may include a processing unit/processor and a transceiver unit/transceiver. The processing unit/processor may perform processing operations in this application, for example, operations such as determining. The transceiver unit/transceiver is configured to communicate with the non-AP MLD or the non-AP STA that is in the non-AP MLD and that is associated with the AP. Therefore, the AP in the AP MLD may perform the processing and receiving and sending operations in this application.

In another implementation, each AP in the AP MLD includes only a transceiver unit/transceiver, the AP MLD includes a processing unit/processor, and all APs in the AP MLD may share the processing unit/processor. Therefore, the AP in the AP MLD may perform the receiving and sending operations in this application, and the AP MLD may perform the processing operations in this application.

In another implementation, the AP MLD may include a processing unit/processor and a transceiver unit/transceiver. The processing unit/processor may perform processing operations in this application, for example, operations such as determining. The transceiver unit/transceiver is configured to communicate with the non-AP MLD. Therefore, the AP MLD may perform the processing and receiving and sending operations in this application.

For clear and brief description, this application is described by using an example in which the AP in the AP MLD performs the processing and receiving and sending operations in this application.

Enhanced Multi-Link Operation

In the enhanced multi-link operation, the non-AP MLD may monitor multiple links. After an initial control frame sent to the non-AP MLD is received on a link, a receive channel on another link may be switched to the link, so that after the initial control frame is received, a data frame may be received at a higher rate.

The enhanced multi-link operation includes an enhanced multi-link single-radio (EMISR) operation and an enhanced multi-link multi-radio (EMLMR) operation. In the EMISR operation, the non-AP MLD can monitor multiple links, but can perform data communication only on one link. In the EMLMR operation, the non-AP MLD can monitor multiple links, and can also perform data communication on multiple links. The common point is that a quantity of receive channels is A during monitoring, and a quantity of receive channels is B during data transmission, where B is greater than A.

Figure 1:
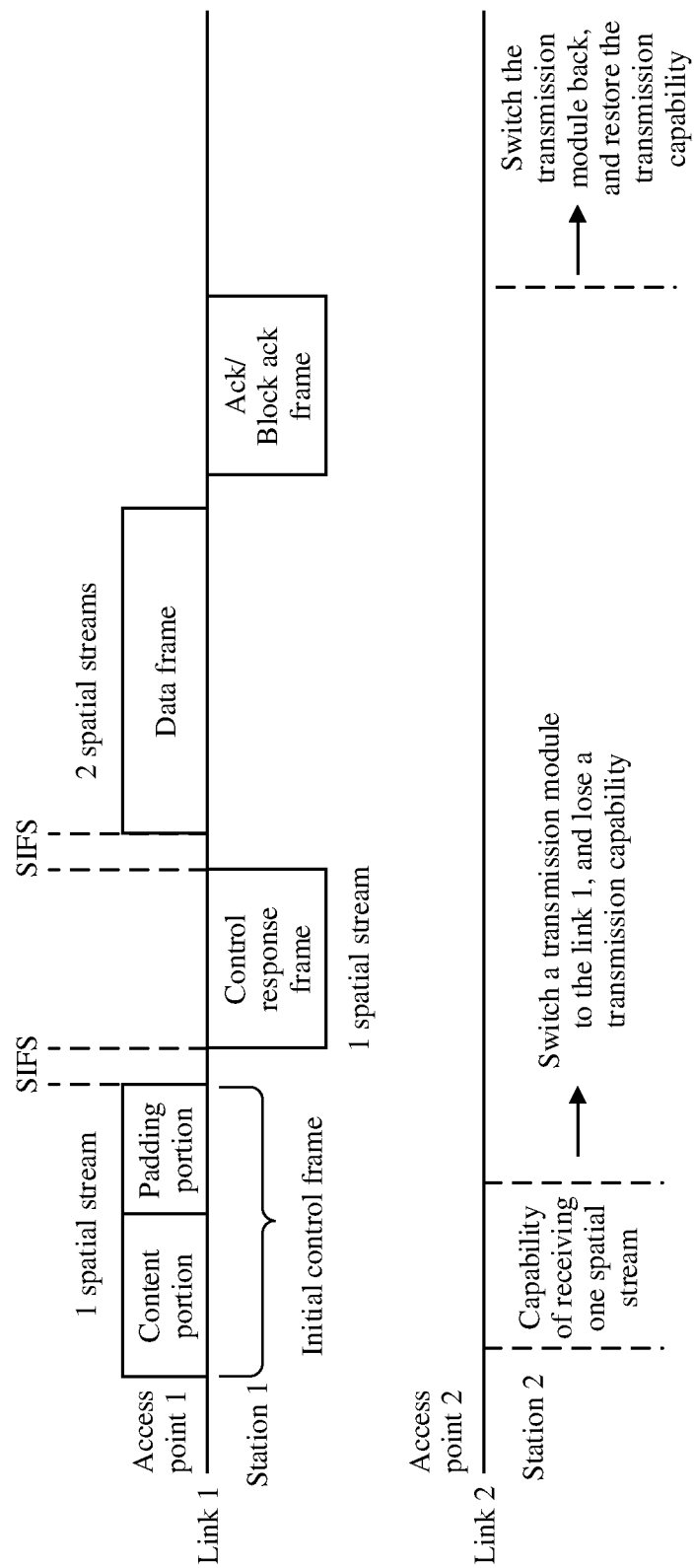
FIG. 1 is a schematic diagram of a transmission channel switching process according to an embodiment of this application.

The solutions of this application are mainly applied to a wireless local area network. As shown in FIG. 1, the communication system in this application includes the AP MLD 100 and the non-AP MLD 200. The one or more non-AP STAs in the non-AP MLD 200 and the one or more APs in the AP MLD may communicate after establishing an association relationship.

It should be noted that the terms "system" and "network" may be used interchangeably in embodiments of this application. "A plurality of" means two or more. In view of this, "a plurality of" may also be understood as "at least two" in embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

As shown in FIG. 1, time in which the non-AP MLD can switch transmission channels includes: padding duration of an initial control frame, a first inter-frame space between the initial control frame and a control response frame, duration occupied by the control response frame, and a second inter-frame space between the control response frame and a data frame. However, the duration occupied by the control response frame depends on a transmission rate of the initial control frame. Therefore, before receiving the initial control frame, the STA cannot determine the duration occupied by the control response frame, and therefore cannot determine the padding duration of the initial control frame.

An embodiment of this application provides an information indication solution. A first STA in a non-AP MLD generates a first frame. The first frame includes indication information. The indication information indicates padding duration required for a channel switch delay in an initial control frame, the padding duration is determined based on duration of a control response frame, or the indication information indicates a delay required for switching a quantity of transmission channels from a first quantity of channels to a second quantity of channels, or the indication information indicates a delay required for switching a quantity of transmission channels of the first STA from a first value to a second value. The non-AP MLD or the first STA or another STA in the non-AP MLD transmits the first frame. An AP MLD or a first AP or another AP in the AP MLD receives the first frame, and determines the padding duration of the initial control frame based on the indication information. Based on the foregoing solution, the padding duration of the initial control frame may be accurately determined, so that the first STA can complete switching of a corresponding quantity of transmission channels before a subsequent data frame arrives.

Figure 3:
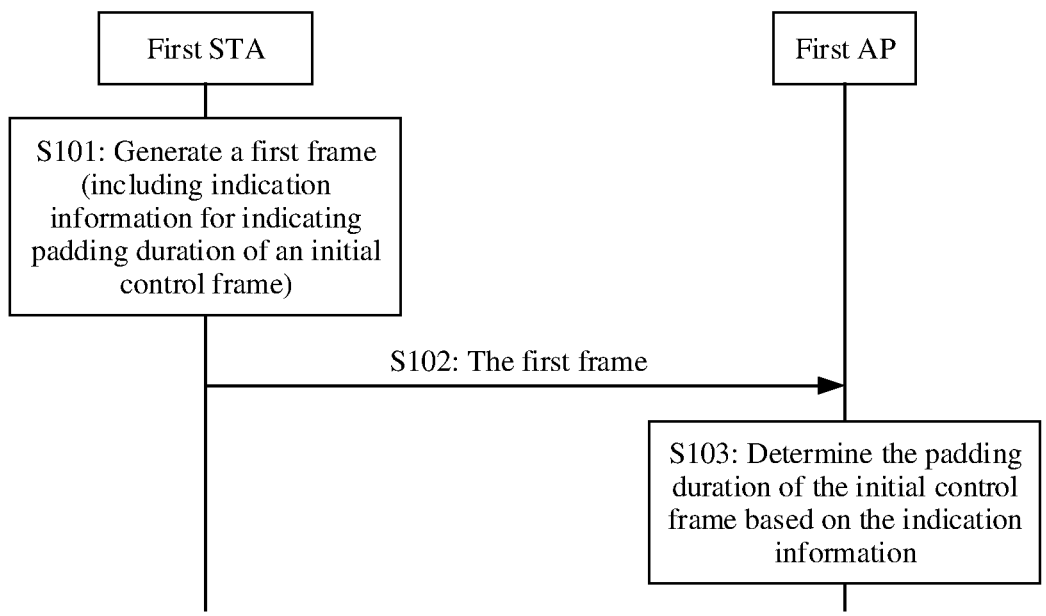
FIG. 3 is a schematic flowchart of an information indication method according to an embodiment of this application.

FIG. 3 is a schematic flowchart of an information indication method according to an embodiment of this application. The method includes the following steps.

S101: A first STA generates a first frame.

As shown in FIG. 1, for example, a quantity of transmission channels is switched from one to two. Before the switching, both a non-AP STA 1 on a link 1 and a non-AP STA 2 on a link 2 have a capability of receiving one spatial stream, or both the non-AP STA 1 and the non-AP STA 2 have one transmission channel. In this application, the transmission channel may also be referred to as a transmit channel, a transmission module, a spatial stream, or the like. An AP 1 on the link 1 transmits an initial control frame to the non-AP STA 1. The initial control frame includes a content portion and a padding portion (namely, padding bits). After receiving the content portion of the initial control frame sent by the AP 1, the non-AP STA 1 may start to perform switching, as long as the switching is completed before a subsequent data frame arrives. The non-AP STA 1 starts switching. In this case, the non-AP STA 2 switches the transmission module to the link 1, and the link 2 loses a transmission capability. Certainly, this is for EMLSR. For the EMIMR, the non-AP STA 2 may have a plurality of transmission modules. After one transmission module is switched to the non-AP STA 1, the non-AP STA 2 may further perform data communication by using another transmission module.

After receiving the content portion of the initial control frame sent by the AP 1, the non-AP STA 1 may start to perform switching. Therefore, time in which the non-AP STA 1 can switch transmission channels includes: padding duration of the initial control frame sent by the AP 1, a first inter-frame space between the initial control frame and a control response frame, a second inter-frame space between the control response frame and the data frame, and duration in which the non-AP STA 1 transmits the control response frame. The first inter-frame space and the second inter-frame space are a short inter-frame space (short inter-frame space, SIFS). The short inter-frame space is generally 16 μs. Therefore, the key to determining the padding duration of the initial control frame is to determine the duration of the control response frame.

The determining the duration of the control response frame includes: determining a rate of the control response frame, and determining the duration of the control response frame based on the rate of the control response frame and a length of the control response frame. Therefore, the padding duration of the initial control frame=switch delay–first inter-frame space–duration of the control response frame–second inter-frame space. The switch delay may be set on the first STA before factory delivery. Optionally, the time that can be used to switch transmission channels further includes a specific margin Δ. Therefore, the padding duration of the initial control frame=switch delay–first inter-frame space–duration of the control response frame–second inter-frame space–Δ. The margin Δ may be, for example, a preamble portion of the data frame.

Further, to maximize the switch delay, a maximum value of the padding duration may be determined. The maximum value of the padding duration is determined based on a minimum value of the duration of the control response frame. The minimum value of the duration of the control response frame may also be referred to as minimum duration of the control response frame.

Specifically, that the first STA determines the minimum value of the duration of the control response frame includes: determining a maximum value of the rate of the control response frame, and determining the minimum value of the duration of the control response frame based on the maximum value of the rate of the control response frame and the length of the control response frame. Therefore, the maximum value of the padding duration of the initial control frame=switch delay–first inter-frame space–minimum value of the duration of the control response frame–second inter-frame space. The maximum value of the padding duration of the initial control frame is padding duration of the initial control frame when a first AP transmits the initial control frame at a maximum rate. Optionally, the time that can be used to switch transmission channels further includes a specific margin Δ. Therefore, the maximum value of the padding duration of the initial control frame=switch delay–first inter-frame space–minimum value of the duration of the control response frame–second inter-frame space–Δ.

With respect to the maximum value of the rate of the control response frame, in an implementation, the maximum value of the rate of the control response frame is a highest rate that is in a basic service set basic rate set (BSSBasicRateSet) and that is less than or equal to the maximum rate of the initial control frame. BSSBasicRateSet is a parameter broadcast by an AP MLD before a link is established. The AP MLD notifies, by broadcasting, a non-AP MLD that wants to establish a link with the AP MLD. If the non-AP MLD has a capability of receiving data when the AP MLD sends data at any rate in the BSSBasicRateSet, the non-AP MLD may establish a link with the AP MLD. The rate included in the BSSBasicRateSet may be, for example, {6, 12, 24, 48}. The maximum rate of the initial control frame may be a variable. The maximum rate of the initial control frame does not exceed the highest rate in the BSSBasicRateSet. For example, if the maximum rate of the initial control frame is 24, the maximum value of the rate of the control response frame is 24. For another example, if the maximum rate of the initial control frame is 12, the maximum value of the rate of the control response frame is 12.

In another implementation, the maximum rate of the initial control frame is a fixed value, for example, 24 Mbps. Therefore, the maximum rate of the control response frame=min {24 Mbps, the highest rate in BSSBasicRateSet parameters}. For example, if the highest rate in the BSSBasicRateSet parameters is 48, the maximum rate of the control response frame=min {24 Mbps, 48 Mbps}. In other words, the maximum value of the rate of the control response frame is 24 Mbps.

In addition, the duration of the control response frame is further associated with a format of the control response frame. Therefore, the minimum value of the duration of the control response frame may be determined based on the maximum value of the rate of the control response frame, the format of the control response frame, and the length of the control response frame.

Figure 4:
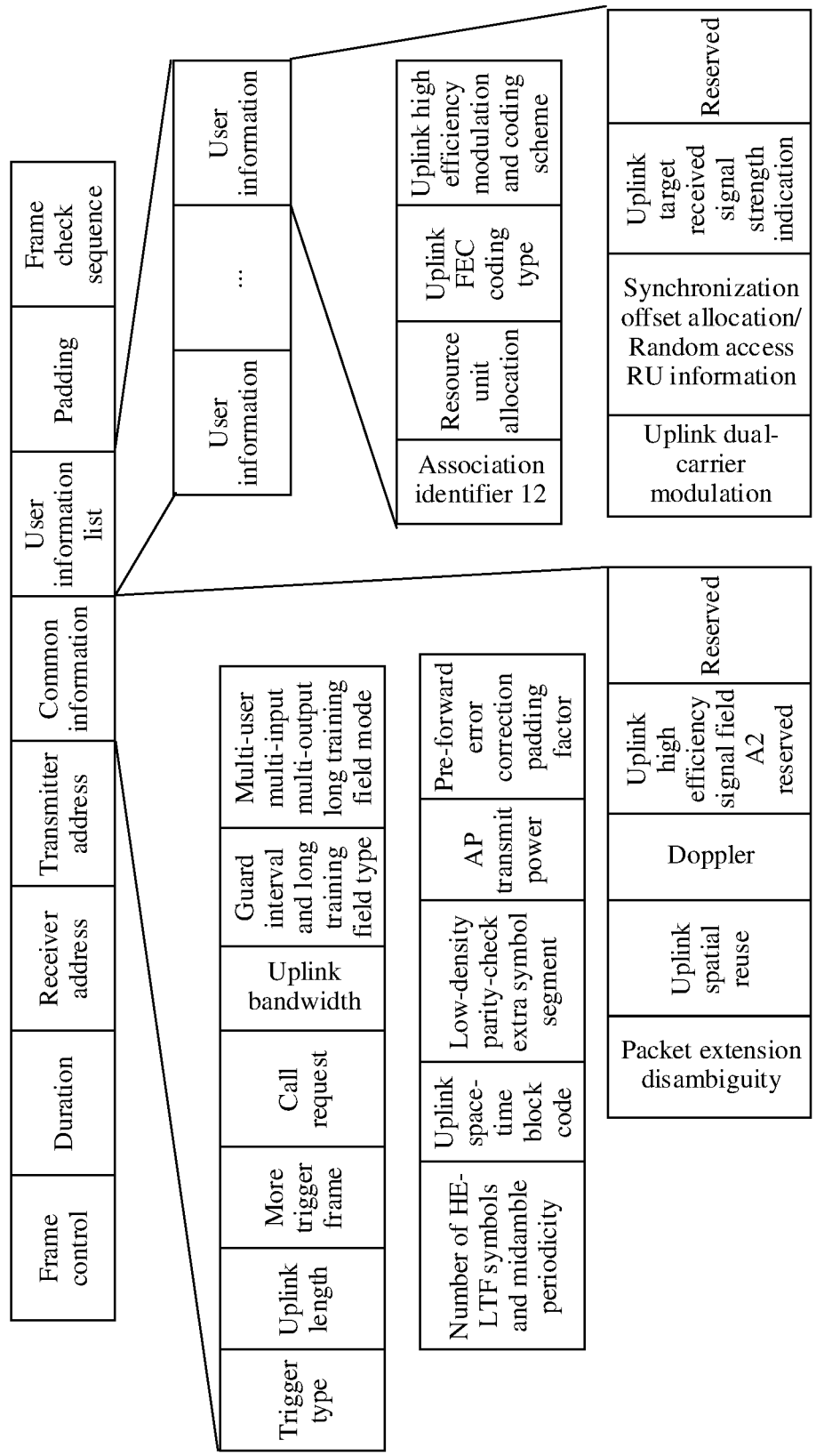
FIG. 4 is a schematic diagram of a format of an MU-RTS frame.

In an implementation, if the initial control frame is an MU-RTS frame, the control response frame is a CIS frame. The MU-RTS frame is a type of trigger frame. When a value of a trigger type in the trigger frame is 3, it indicates that the trigger frame is an MU-RTS frame. A format of the MU-RTS frame is shown in FIG. 4. The MU-RTS frame includes the following fields: frame control, duration, receiver address (RA), transmitter address (TA), common information, user information list (user info list), padding, and frame check sequence (FCS). The common information field further includes a plurality of fields. The user information list field includes one or more pieces of user information.

In the common information field, the following fields are reserved fields (not used for the MU-RTS frame): uplink length (UL length), guard interval and long training field type (GI and LTF type), multi-user multi-input multi-output long training field mode (MU-MIMO LTF mode), number of high efficiency long training field symbols and midamble periodicity (number of HE-LTF symbols and midamble periodicity), uplink space-time block code (UL STBC), low-density parity-check code extra symbol segment (LDPC extra symbol segment), access point transmit power (AP TX power), pre-forward error correction padding factor (pre-FEC padding factor), packet extension disambiguity (PE disambiguity), uplink spatial reuse (UL spatial reuse), Doppler, and uplink high efficiency signal field A2 reserved (UL HE-SIG-A2 reserved).

In the user information field, the following fields are reserved fields: uplink high efficiency modulation and coding scheme (UL HE-MCS), uplink FEC coding type (UL FEC coding type), uplink dual-carrier modulation (UL DCM), synchronization offset allocation/random access RU information (SS allocation/RA-RU information), and uplink target received signal strength indicator (UL target RSSI).

The initial control frame includes a content portion and padding bits. After a non-AP STA receives user information in an initial control frame sent by an AP and content of previous fields (including fields such as frame control, duration, receiver address, transmitter address, and common information), it is considered that the non-AP STA receives a content portion of the initial control frame. The padding bits of the initial control frame include another user information portion and a padding field in the initial control frame. In particular, the FCS field may be considered as a content portion of the initial control frame, or may be considered as a padding bit of the initial control frame.

Figure 5:
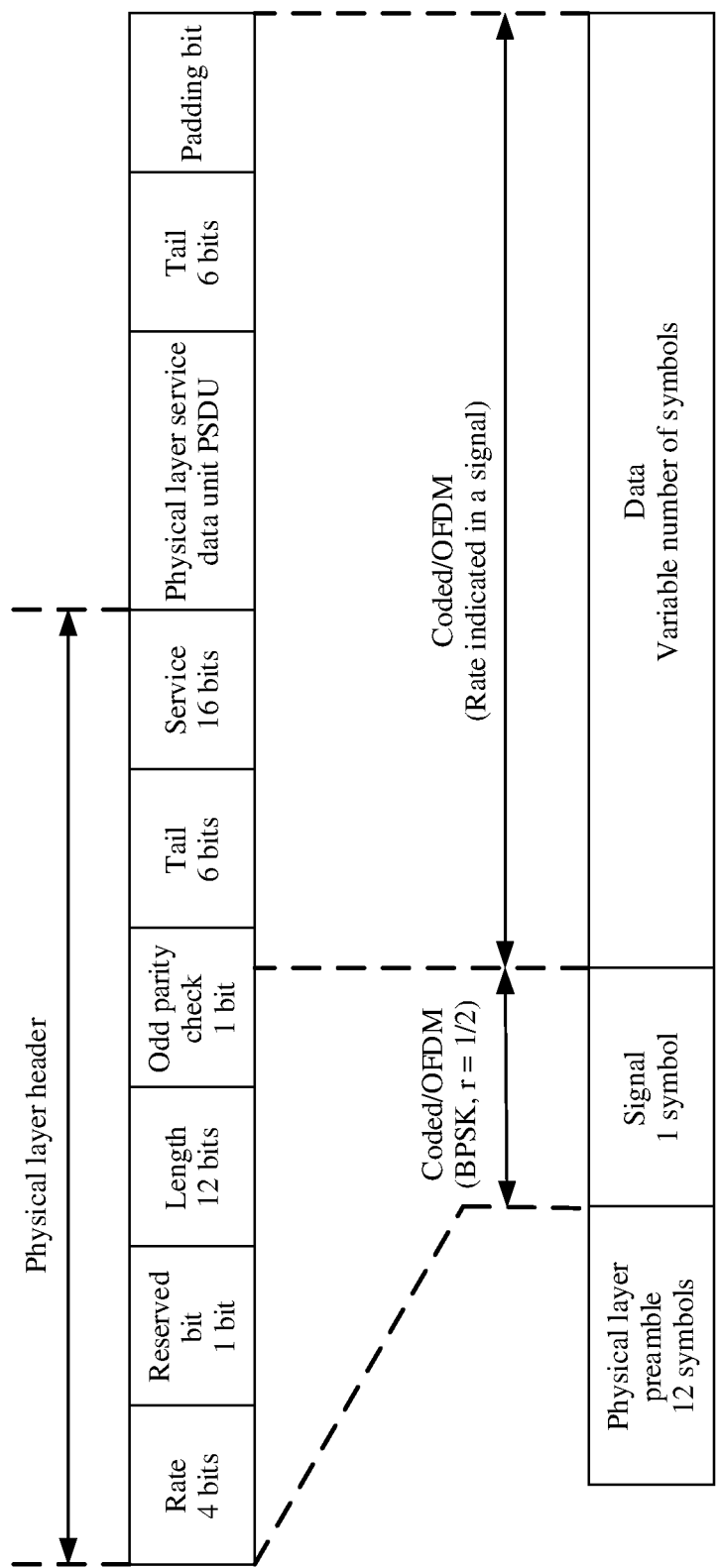
FIG. 5 is a schematic diagram of a frame format of a non-HT PPDU.
Figure 6:
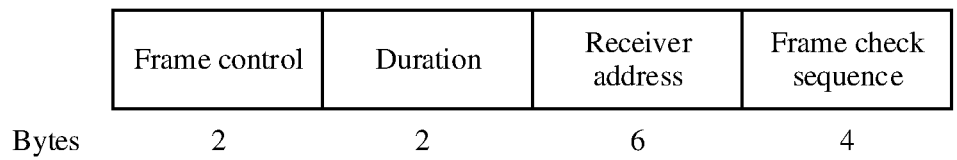
FIG. 6 is a schematic diagram of a format of a CTS frame.

If the initial control frame is an MU-RTS frame, the control response frame is a CTS frame. A format of the sent CTS frame may be a non-HT or non-HT duplicate format. A frame format of a non-HT PPDU is shown in FIG. 5. The CTS frame includes the following fields: physical layer preamble (PHY preamble), signal, and data. The physical layer preamble occupies 12 orthogonal frequency division multiplexing (OFDM) symbols, the signal occupies one OFDM symbol, and the OFDM symbol occupied by the data is variable. It takes 20 µs to transmit the physical layer preamble field and the signal field. The data field includes a 16-bit service field, a 112-bit (namely, 14-byte) PSDU field, and a 6-bit tail field, and is 16+112+6=134 bits in total. A frame structure of the CTS frame is shown in FIG. 6. A physical layer service data unit (PSDU) includes a frame control field, a duration field, a receiver address (RA) field, and an FCS field. The four fields separately occupy 2 bytes, 2 bytes, 6 bytes, and 4 bytes, and a total of 14 bytes are occupied. For example, when the rate of the control response frame is 24 Mbps, the duration required for transmitting 134 bits is 134/24=5.583 µs. Because the length of the data portion (namely, the data field) needs to be an integer multiple of 4 µs, the length of the data field is actually 8 µs. During specific implementation, bits are added to a pad bits field to reach 8 µs. Therefore, the duration of the control response frame is 20+8=28 µs. For another example, when the rate of the control response frame is 6 Mbps, the duration required for transmitting 134 bits is 134/6=22.33 µs, and needs to be aligned to 24 µs. Therefore, the total duration is 20+24=44 µs.

In another implementation, if the initial control frame is a BSRP frame, the control response frame is a QoS-Null frame. A frame structure of the BSRP frame is the same as that of the MU-RTS frame. Refer to FIG. 4. When a value of a trigger type in the trigger frame is 4, it indicates that the trigger frame is a BSRP frame. In addition, a field reserved in the MU-RTS frame is used in the BSRP frame, and is no longer a reserved field. A format of the QoS-Null frame is shown in FIG. 7. The QoS-Null frame includes the following fields: frame control, duration, address 1, address 2, address 3, sequence control, address 4, quality of service control (QoS control), high throughput control (HT control), and frame check sequence (FCS). The QoS-Null frame needs to be transmitted in an HE TB PPDU format or an EHT TB PPDU format. Preambles in the two formats are long, and a preamble portion exceeds 50 µs. Therefore, when the control response frame is a QoS-Null frame, duration of the QoS-Null frame is greater than the duration of the control response frame being the CTS frame, and a requirement for the padding duration of the initial control frame is lower. Therefore, in this embodiment, the padding duration of the initial control frame may be reported by using an example in which the control response frame is the CTS frame.

After determining the padding duration of the initial control frame, the first STA may generate the first frame.

In an implementation, the first frame includes indication information. The indication information indicates the padding duration for the channel switch delay in the initial control frame. Optionally, the padding duration is padding duration required when the initial control frame is transmitted at the maximum rate, or the padding duration is determined based on the maximum rate of the initial control frame, or the padding duration is padding duration required when the initial control frame is transmitted at 24 Mbps, or the padding duration is padding duration required when the initial control frame is transmitted at any rate, or the padding duration is a maximum value of padding duration required when the initial control frame is transmitted at all rates.

Specifically, in an example, a relationship between one or more padding durations and the indication information may be predefined or pre-negotiated by the first STA and the first AP. The relationship is described in the following Table 1:

TABLE 1

| Indication information | Padding duration required for a switch delay |
|---|---|
| First value (for example, 0) | 0 µs |
| Second value (for example, 1) | 32 µs |
| Third value (for example, 2) | 64 µs |
| Fourth value (for example, 3) | 96 µs |

TABLE 1-continued

| Indication information | Padding duration required for a switch delay |
|---|---|
| Fifth value (for example, 4) | 128 μs |
| Sixth value (for example, 5) | 160 μs |
| Seventh value (for example, 6) | 192 μs |
| Eighth value (for example, 7) | 224 μs |
| ... | ... |

According to Table 1, when the indication information is the first value, it indicates that the padding duration is 0 μs; when the indication information is the second value, it indicates that the padding duration is less than or equal to 32 μs; when the indication information is the third value, it indicates that the padding duration is less than or equal to 64 μs. The rest may be deduced by analogy.

In another example, a relationship between one or more padding duration and the indication information may be predefined or pre-negotiated by the first STA and the first AP. The relationship is described in the following Table 2:

TABLE 2

| Indication information | Padding duration required for a switch delay |
|---|---|
| First value (for example, 0) | 0 μs |
| Second value (for example, 1) | 32 μs |
| Third value (for example, 2) | 64 μs |
| Fourth value (for example, 3) | 128 μs |
| Fifth value (for example, 4) | 256 μs |
| ... | ... |

In another implementation, the first frame includes a plurality of pieces of indication information. Each of the plurality of pieces of indication information indicates padding duration of the initial control frame corresponding to a transmission rate of the initial control frame.

For example, the first STA transmits the first frame to the first AP. The first frame includes the plurality of pieces of indication information.

A first piece of indication information indicates padding duration of the initial control frame corresponding to a transmission rate of the initial control frame being 6 Mbps.

A second piece of indication information indicates padding duration of the initial control frame corresponding to a transmission rate of the initial control frame being 12 Mbps.

A third piece of indication information indicates padding duration of the initial control frame corresponding to a transmission rate of the initial control frame being 24 Mbps.

The first STA may determine, based on Table 1, which indication information indicates padding duration of different initial control frames. For example, if the padding duration of the initial control frame corresponding to the transmission rate of the initial control frame being 6 Mbps is greater than 0 μs and less than or equal to 32 μs, it indicates the first piece of indication information. If the padding duration of the initial control frame corresponding to the transmission rate of the initial control frame being 12 Mbps is greater than 32 μs and less than or equal to 64 μs, it indicates the second piece of indication information. If the padding duration of the initial control frame corresponding to the transmission rate of the initial control frame being 24 Mbps is greater than 64 μs and less than or equal to 96 μs, it indicates the third piece of indication information.

S102: The first STA transmits the first frame. Correspondingly, the first AP associated with the first STA receives the first frame.

Figure 8:
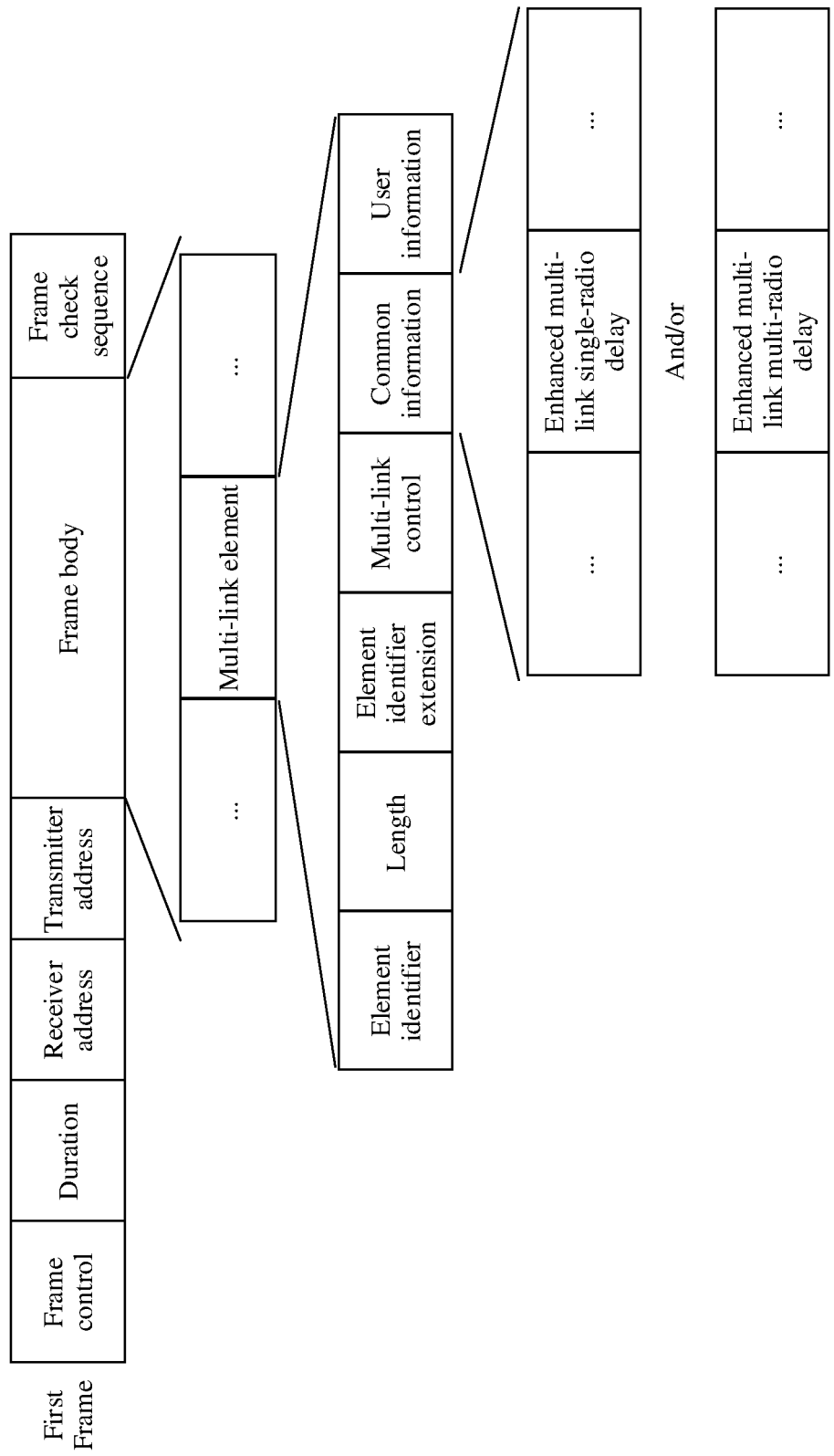
FIG. 8 is a schematic diagram of an example format of a first frame according to an embodiment of this application.

The first frame includes the indication information. FIG. 8 is a schematic diagram of an example format of the first frame. The first frame includes the following fields: frame control, duration, receiver address, transmitter address, frame body, and frame check sequence. The frame body further includes fields such as multi-link element. The multi-link element field further includes the following fields: element identifier (element ID), length, element identifier extension (element ID extension), multi-link control, common information, and user information. The common information field further includes fields such as enhanced multi-link single-radio delay (EMISR delay) and/or enhanced multi-link multi-radio delay (EMLMR delay). The indication information may be carried in the EMISR delay field and/or the EMLMR delay field.

If the first frame includes the plurality of pieces of indication information, the plurality of pieces of indication information may alternatively be carried in a field other than the EMLSR delay field and/or the EMLMR delay field.

S103: The first AP determines the padding duration of the initial control frame based on the indication information.

The first AP receives the first frame, and parses out the indication information from the first frame. The padding duration of the initial control frame may be determined based on the indication information.

In the foregoing implementation, the first frame includes the indication information. The indication information indicates the padding duration for the channel switch delay in the initial control frame. In this case, the first AP may determine, based on a pre-stored relationship between one or more padding duration and the indication information shown in Table 1, the padding duration indicated by the indication information. For example, if the indication information is the second value, the first AP may determine, according to Table 1, that the maximum value of the padding duration indicated by the indication information is 32 μs.

In the foregoing another implementation, the first frame includes a plurality of pieces of indication information. Each of the plurality of pieces of indication information indicates padding duration of the initial control frame corresponding to a transmission rate of the initial control frame. In this case, after receiving the plurality of pieces of indication information, the first AP may determine the padding duration based on the transmission rate of the initial control frame. For example, assuming that a rate of the initial control frame actually used by the first AP is 12 Mbps, it may be determined that a maximum value of the padding duration corresponding to the rate is 64 μs.

Further, after determining the padding duration of the initial control frame, the first AP may fill the initial control frame with a corresponding bit, and transmit the initial control frame.

Further, after the second inter-frame space after the first STA receives the initial control frame sent at the maximum rate, and replies the control response frame, the first STA has a capability of receiving a data frame through a second quantity of transmission channels; or after the SIFS after the first STA receives the initial control frame sent at any rate, and replies the control response frame, the first STA needs to have a capability of performing communication through a second quantity of transmission channels.

Because the padding duration is determined based on the duration of the control response frame, when the first AP transmits the initial control frame, regardless of which rate is used, the first STA can complete switching of a quantity of transmission channels before a subsequent data frame arrives.

Further, after receiving the data frame, the first STA transmits an acknowledgment (ACK)/block acknowledgment (block-ACK) frame to the first AP. After the first STA determines that the transmission opportunity (TXOP) on the link 1 ends, a second STA may switch the transmission module back to restore the transmission capability.

According to the information indication method provided in this embodiment of this application, the non-AP STA generates the first frame. The first frame includes the indication information for indicating the padding duration required for the channel switch delay in the initial control frame. The padding duration is determined based on the duration of the control response frame and/or the maximum rate of the initial control frame. The non-AP STA transmits the first frame. The AP receives the first frame. The first AP determines the padding duration of the initial control frame based on the indication information. Therefore, the padding duration of the initial control frame may be accurately determined, so that the first STA can complete switching of a corresponding quantity of transmission channels before a subsequent data frame arrives.

Figure 9:
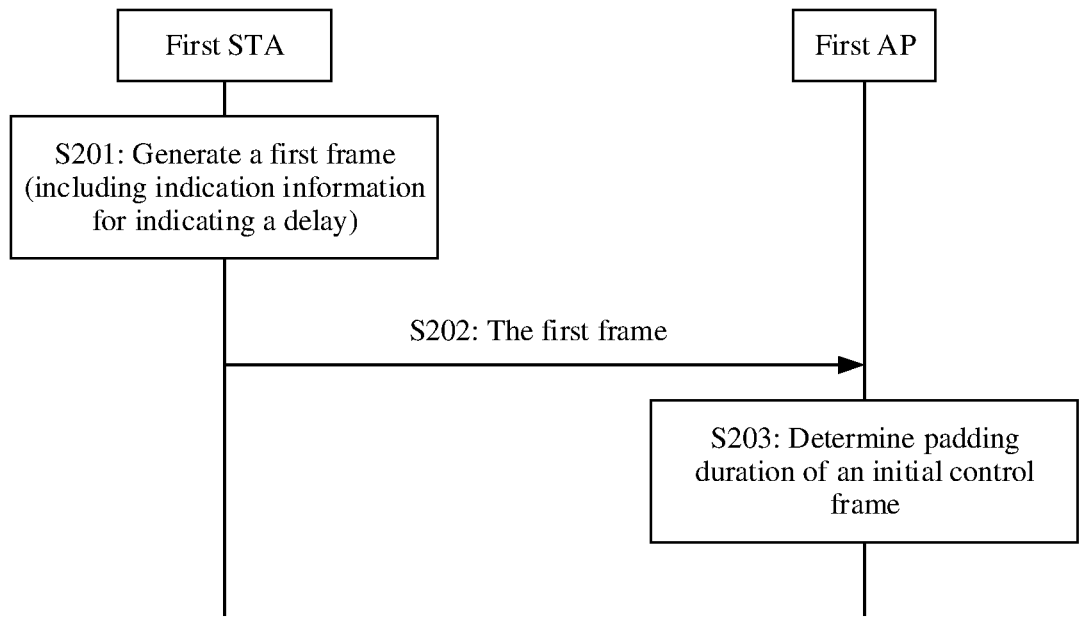
FIG. 9 is a schematic flowchart of another information indication method according to an embodiment of this application.

FIG. 9 is a schematic flowchart of another information indication method according to an embodiment of this application. The method may include the following steps.

S201: A first STA generates a first frame.

The first frame includes first indication information.

In an implementation, the first indication information indicates a first delay required for switching a quantity of transmission channels of the first STA from a first value to a second value. For example, in FIG. 1, a quantity of first channels is 1, a quantity of second channels is 2, and the first indication information indicates a delay required for switching a quantity of transmission channels from 1 to 2. The first delay may be a value preset on the first STA before factory delivery.

A correspondence between one or more switch delays and the first indication information may be predefined. The correspondence may be described in Table 1 or Table 2. For example, if the delay required for switching the quantity of transmission channels of the first STA from the first value to the second value is 32 µs, the corresponding first indication information is the second value. If the delay required for switching the quantity of transmission channels of the first STA from the first value to the second value is 64 µs, the corresponding first indication information is the third value.

The first STA generates the first frame. The first frame includes the first indication information. Specifically, a format of the first frame may be shown in FIG. 8. The first indication information may be carried in an EMISR delay field and/or an EMLMR delay field.

In another implementation, the first frame includes first indication information and second indication information. The first indication information indicates a first delay required for switching a quantity of transmission channels of the first STA from a first value to a second value. The second indication information indicates a second delay required for switching a quantity of transmission channels from a second quantity of channels to a first quantity of channels, namely, a delay required for switching the quantity of transmission channels back to the first quantity of channels after the first STA completes receiving the data frame.

In still another implementation, the first frame includes third indication information. The third indication information indicates a larger value between the first delay and the second delay, namely, max {the first delay, the second delay}.

S202: The first STA transmits the first frame. Correspondingly, a first AP receives the first frame.

The first AP receives the first frame, and parses the foregoing fields in the first frame to obtain the first delay.

S203: The first AP determines padding duration of an initial control frame, where the padding duration of the initial control frame is determined based on the first delay.

After obtaining the first indication information, the first AP may determine the padding duration based on the first delay.

Specifically, if the initial control frame is an MU-RTS frame, the determined padding duration includes: the padding duration=first delay−2×SIFS−duration of the control response frame.

The duration of the control response frame is determined based on a rate of the control response frame. The rate of the control response frame is determined based on a rate of the initial control frame and BSSBasicRateSet parameters. Specifically, the rate of the control response frame is a highest rate that is in a BSSBasicRateSet and that is less than or equal to the rate of the initial control frame, namely, min {the rate of the initial control frame, the highest rate in the BSSBasicRateSet parameters}.

After the rate of the control response frame is determined, the duration of the control response frame is duration required for transmitting the control response frame at the rate of the control response frame.

Figure 10:
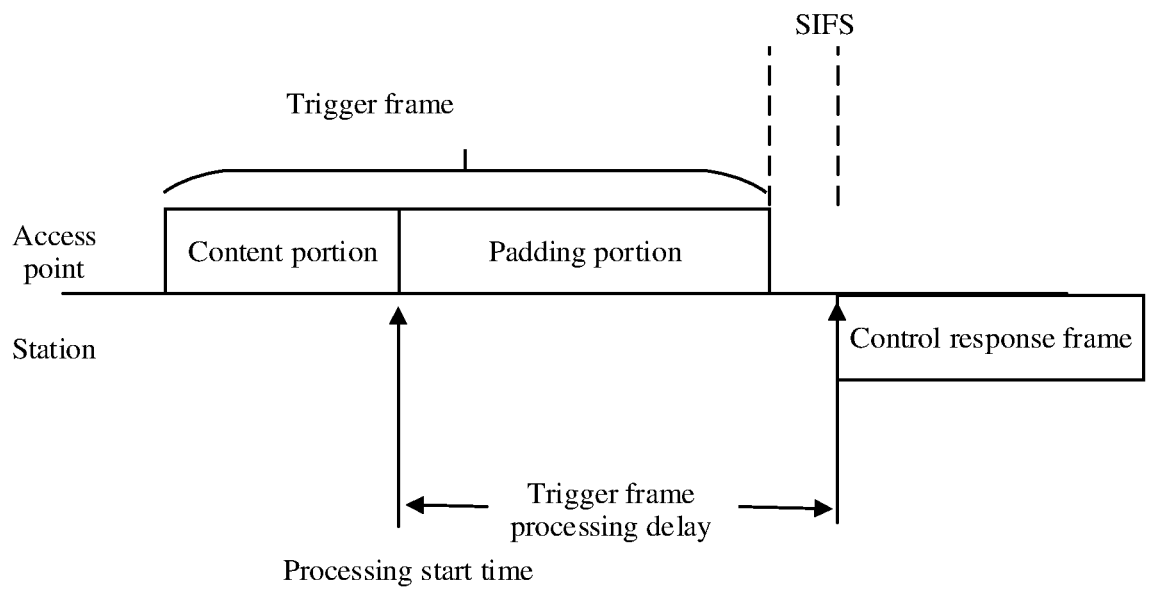
FIG. 10 is a schematic diagram of a relationship between padding duration and a processing delay of a trigger frame.

FIG. 10 is a schematic diagram of a relationship between the padding duration and a processing delay of a trigger frame. If the initial control frame is a BSRP frame, the padding duration is determined, and a sum of the padding duration and the first inter-frame space should be greater than the processing delay of the trigger frame (the initial control frame herein). The padding duration=max {the processing delay of the trigger frame, the switch delay−2× SIFS−the duration of the control response frame}.

Further, after receiving the data frame, the first STA transmits an acknowledgment (ACK)/block acknowledgment (block-ACK) frame to the first AP. After the first STA determines that a transmission opportunity on a link 1 ends, a second STA may switch a transmission module back to restore a transmission capability. After the second delay ends, a second AP transmits a frame, for example, the initial control frame, to the second STA on a link 2, to initiate next transmission. In other words, before the second delay ends, the second AP cannot transmit the frame to the second STA on the link 2.

According to the information indication method provided in this embodiment of this application, the first STA generates the first frame. The first frame includes the indication information. The indication information indicates the delay required for switching the quantity of transmission channels of the first STA from the first value to the second value. The first STA transmits the first frame. The first AP receives the first frame, and can accurately determine the padding duration of the initial control frame, so that the first STA can complete switching of the corresponding quantity of transmission channels before the subsequent data frame arrives.

For the problem raised in the background of this application, embodiments of this application further provides another method and apparatus for determining padding duration.

First, two types of initial control frames are described.

When an initial control frame sent by an AP MLD or an AP in an AP MLD is a second initial control frame, for example, an MU-RTS, a non-AP MLD or a STA in a non-AP MLD replies a CTS frame, and transmits the CTS frame in a non-HT or non-HT duplicate format. The CTS frame in the two formats is used. The non-AP MLD or the STA in the non-AP MLD is not required to complete channel quantity switching. In other words, the non-AP MLD or the STA in the non-AP MLD may switch the channel quantity in transmission time of a control response frame (the CTS frame herein).

When an initial control frame is a first initial control frame, for example, a trigger frame, a non-AP MLD or a STA in a non-AP MLD replies with an HE TB PPDU or an EHT TB PPDU. There is a high requirement for a capability of transmitting the PPDU in the two formats. The non-AP MLD or the STA in the non-AP MLD needs to complete channel quantity switching before transmitting a control response frame (the HE TB PPDU or the EHT TB PPDU herein). It may be learned that when the initial control frames are different (or when the frame formats of the control response frames are different), the required padding duration of the initial control frame is also different. In an implementation, the first initial control frame is a BSRP trigger frame.

Therefore, an embodiment of this application provides a method for determining padding duration.

Method 1:

S1001: A non-AP MLD or a STA in a non-AP MLD reports first duration, where the first duration is padding duration that needs to be included in a first initial control frame (or the first duration is a larger value or a smaller value between the padding duration that needs to be included in the first initial control frame and padding duration that needs to be included in a second initial control frame).

S1002: If an AP MLD or an AP in an AP MLD transmits the first initial control frame to the non-AP MLD or the STA in the non-AP MLD, include a padding bit in the first initial control frame, where the padding duration is the first duration reported in S1001.

S1003: If the AP MLD or the AP in the AP MLD transmits the second initial control frame to the non-AP MLD or the STA in the non-AP MLD, include a padding bit in the second initial control frame, where padding duration is second duration, and the second duration is determined based on the first duration. For example, the second duration is the first duration minus (or plus) fixed time. For example, the fixed time may be 60 μs, or the fixed time may be another value specified in a standard, or the fixed time may be sent by the non-AP MLD or the STA in the non-AP MLD to the AP MLD or the AP in the AP MLD.

In this method, alternatively, the first duration is padding duration that needs to be added to the initial control frame when the non-AP MLD or the STA in the non-AP MLD replies a first frame format, and the second duration is padding duration that needs to be added to the initial control frame when the non-AP MLD or the STA in the non-AP MLD replies a second frame format.

The second frame format may be a non-HT format or a non-HT duplicate format.

The first frame format may be an HE TB format or an EHT TB format.

Method 2:

S2001: A non-AP MLD or a STA in a non-AP MLD reports first duration and second duration, where the first duration is padding duration that needs to be included in a first initial control frame, and the second duration is padding duration that needs to be included in a second initial control frame.

S2002: If an AP MLD or an AP in an AP MLD transmits the first initial control frame to the non-AP MLD or the STA in the non-AP MLD, include a padding bit in the first initial control frame, where the padding duration is the first duration reported in S2001.

S2003: If the AP MLD or the AP in the AP MLD transmits the second initial control frame to the non-AP MLD or the STA in the non-AP MLD, include a padding bit in the second initial control frame, where the padding duration is the second duration reported in S2001.

Method 3:

S3001: A non-AP MLD or a STA in a non-AP MLD reports a switch delay, where the switch delay is a switch delay required for switching the STA from a first quantity of channels to a second quantity of channels.

S3002: An AP MLD or an AP in an AP MLD determines, based on a type of an initial control frame, a length of a padding bit that needs to be added to the initial control frame.

S3003: The AP MLD or the AP in the AP MLD transmits the initial control frame to the non-AP MLD or the STA in the non-AP MLD, where the length of the padding bit added to the initial control frame is determined in S3002.

A possible implementation of S3002 includes:

In a case of the first initial control frame, the duration of the padding bit=switch delay−16 μs.

In a case of the second initial control frame, the duration of the padding bit=switch delay−76 μs.

The first initial control frame may be a BSRP trigger frame, and the second initial control frame may be an MU-RTS frame.

Alternatively, S3002 may be replaced with the following: The AP MLD or the AP in the AP MLD determines, based on a frame format that is of a control response frame and with which the STA expects to reply, the length of the padding bit that needs to be added to the initial control frame. If the AP transmits the first frame format to the STA, the padding duration=switch delay−76 μs. If the AP transmits the second frame format to the STA, the padding duration=switch delay−16 μs. The first frame format may be a non-HT format or a non-HT duplicate format. The second frame format may be an HE TB format or an EHT TB format.

Correspondingly, an embodiment of this application further provides an apparatus that can implement the foregoing method. The apparatus is configured to implement any one of the foregoing methods. The apparatus may have a plurality of product forms. For a specific product form, refer to a type described below in this application. Details are not described herein again.

The method provided in embodiments of this application is described above. It may be understood that, to implement the method, a communication apparatus (for example, an AP, a non-AP STA, an AP MLD, or a non-AP MLD) includes a corresponding hardware structure and/or software module for performing the method. A person skilled in the art may be aware that this application can be implemented by hardware, software, or a combination of hardware and software.

The communication apparatus provided in this embodiment of this application may be divided into functional modules based on the foregoing method. For example, the communication apparatus may correspond to a functional module of each step in the method, or two or more steps may be integrated into one functional module. The foregoing functional modules may be implemented by using hardware, or may be implemented by using software, or may be implemented by using software in combination with hardware. It should be noted that, in this embodiment of this application, division into the functional modules is an example, and is merely logical function division. During actual implementation, another division manner may be used. The following uses an example in which each step corresponds to one functional module for description.

Figure 11:
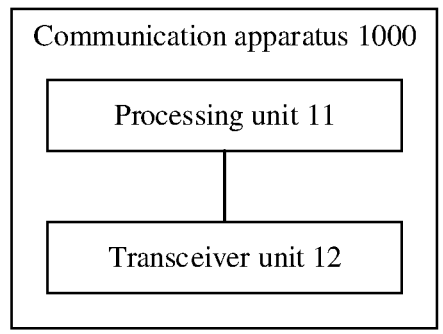
FIG. 11 is a schematic diagram of a structure of a communication apparatus according to an embodiment of this application.

FIG. 11 is a possible schematic diagram of a structure of a communication apparatus. The communication apparatus 1000 includes a processing unit 11 and a transceiver unit 12.

In an embodiment, the communication apparatus may be a non-AP MLD or a non-AP STA in a non-AP MLD. The processing unit 11 is configured to generate a first frame. The first frame includes indication information. The indication information indicates padding duration required for a channel switch delay in an initial control frame. The padding duration is determined based on duration of a control response frame. The transceiver unit 12 is configured to transmit the first frame.

Optionally, the processing unit 11 is further configured to determine the duration of the control response frame.

Optionally, the processing unit 11 is further configured to determine a minimum value of the duration of the control response frame.

Optionally, the processing unit 11 is further configured to determine a rate of the control response frame, and determine the duration of the control response frame based on the rate of the control response frame and a length of the control response frame.

Optionally, the processing unit 11 is further configured to determine a maximum value of the rate of the control response frame, and determine the minimum value of the duration of the control response frame based on the maximum value of the rate of the control response frame and the length of the control response frame.

In another embodiment, the communication apparatus may be an AP MLD or an AP in an AP MLD. The transceiver unit 12 is configured to receive a first frame. The first frame includes indication information. The indication information indicates padding duration required for a channel switch delay in an initial control frame. The padding duration is determined based on duration of a control response frame. The processing unit 11 is configured to determine the padding duration of the initial control frame based on the indication information.

Optionally, the first frame includes a plurality of pieces of indication information. Each of the plurality of pieces of indication information indicates padding duration of the initial control frame corresponding to a transmission rate of the initial control frame. The processing unit 11 is further configured to determine, based on the first frame, the padding duration of the initial control frame corresponding to the transmission rate of the initial control frame.

In another embodiment, the communication apparatus may be a non-AP MLD or a non-AP STA in a non-AP MLD. The processing unit 11 is configured to generate a first frame. The first frame includes indication information. The indication information indicates a delay required for switching a quantity of transmission channels of a station from a first value to a second value. The transceiver unit 12 is configured to transmit the first frame.

In another embodiment, the communication apparatus may be an AP MLD or an AP in an AP MLD. The transceiver unit 12 is configured to receive a first frame. The first frame includes indication information. The indication information indicates a delay required for switching a quantity of transmission channels of a station from a first value to a second value. The processing unit 11 is configured to determine padding duration of an initial control frame. The padding duration of the initial control frame is determined based on the delay.

Figure 12:
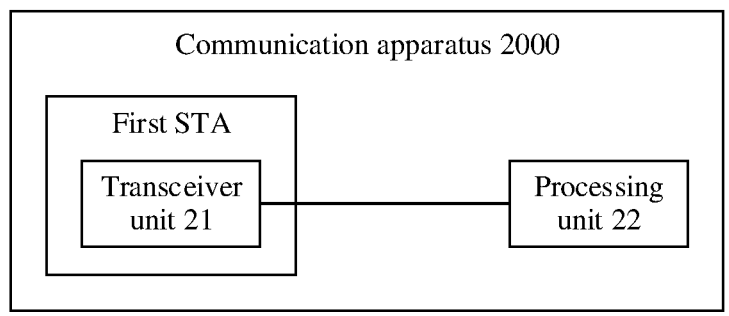
FIG. 12 is a schematic diagram of a structure of another communication apparatus according to an embodiment of this application.

FIG. 12 is a possible schematic diagram of a structure of a communication apparatus. The communication apparatus 2000 may be a non-AP MLD. The communication apparatus 2000 includes a first STA and a processing unit 22. The communication apparatus 2000 may further include more non-AP STAs. The first STA includes a transceiver unit 21.

In an embodiment, the processing unit 22 in the non-AP MLD is configured to: generate a first frame, where the first frame includes indication information, the indication information indicates padding duration required for a channel switch delay in an initial control frame, and the padding duration is determined based on duration of a control response frame; and transmit the first frame to the transceiver unit 21 of the first STA. The transceiver unit 21 is configured to transmit the first frame.

In another embodiment, the processing unit 22 in the non-AP MLD is configured to: generate a first frame, where the first frame includes indication information, and the indication information indicates a delay required for switching a quantity of transmission channels of a station from a first value to a second value; and transmit the first frame to the transceiver unit 21 of the first STA. The transceiver unit 21 is configured to transmit the first frame.

Figure 13:
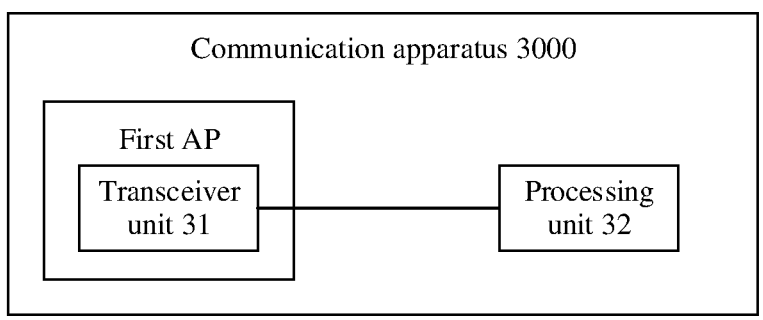
FIG. 13 is a schematic diagram of a structure of another communication apparatus according to an embodiment of this application.

FIG. 13 is a possible schematic diagram of a structure of a communication apparatus. The communication apparatus 3000 may be an AP MLD. The communication apparatus 3000 includes a first AP and a processing unit 32. The first AP includes a transceiver unit 31. The communication apparatus 300 may further include more APs.

In an embodiment, the transceiver unit 31 is configured to receive a first frame. The first frame includes indication information. The indication information indicates padding duration required for a channel switch delay in an initial control frame. The padding duration is determined based on duration of a control response frame. The transceiver unit 31 is further configured to transmit the first frame to the AP MLD. Therefore, the processing unit 32 in the AP MLD is configured to determine the padding duration of the initial control frame based on the indication information.

In another embodiment, the transceiver unit 31 is configured to receive a first frame. The first frame includes indication information. The indication information indicates a delay required for switching a quantity of transmission channels of a station from a first value to a second value. The transceiver unit 31 is further configured to transmit the first frame to the AP MLD. Therefore, the processing unit 32 in the AP MLD determines padding duration of an initial control frame. The padding duration of the initial control frame is determined based on the delay.

For example, when a transmit end is in the structure shown in FIG. 12, correspondingly a receive end may be in the structure shown in FIG. 11 or FIG. 13. When a receive end is in the structure shown in FIG. 13, correspondingly a transmit end may be in the structure shown in FIG. 11 or FIG. 12.

Figure 14:
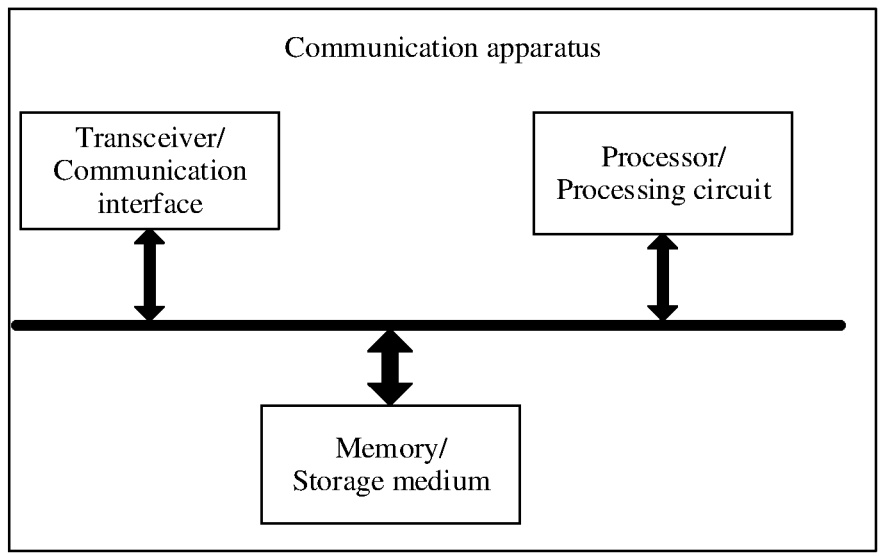
FIG. 14 is a schematic diagram of a structure of another communication apparatus according to an embodiment of this application.

FIG. 14 is a structural diagram of a possible product form of a communication apparatus according to an embodiment of this application. FIG. 14 is a specific form of the communication apparatus shown in FIG. 11.

In a possible product form, the communication apparatus may be an information transmission device/an information transmission board. The communication apparatus includes a processor and a transceiver. Optionally, the communication apparatus may further include a memory. The processor is configured to perform the method steps performed by the processing unit 11 in FIG. 11. The transceiver is configured to perform the method steps performed by the transceiver unit 12 in FIG. 11.

In another possible product form, the communication apparatus may be a chip. The communication apparatus includes a processing circuit and a communication interface. Optionally, the communication apparatus may further include a storage medium. The processing circuit is configured to perform the method steps performed by the processing unit 11 in FIG. 11. The communication interface is configured to perform the method steps performed by the transceiver unit 12 in FIG. 11.

Figure 15:
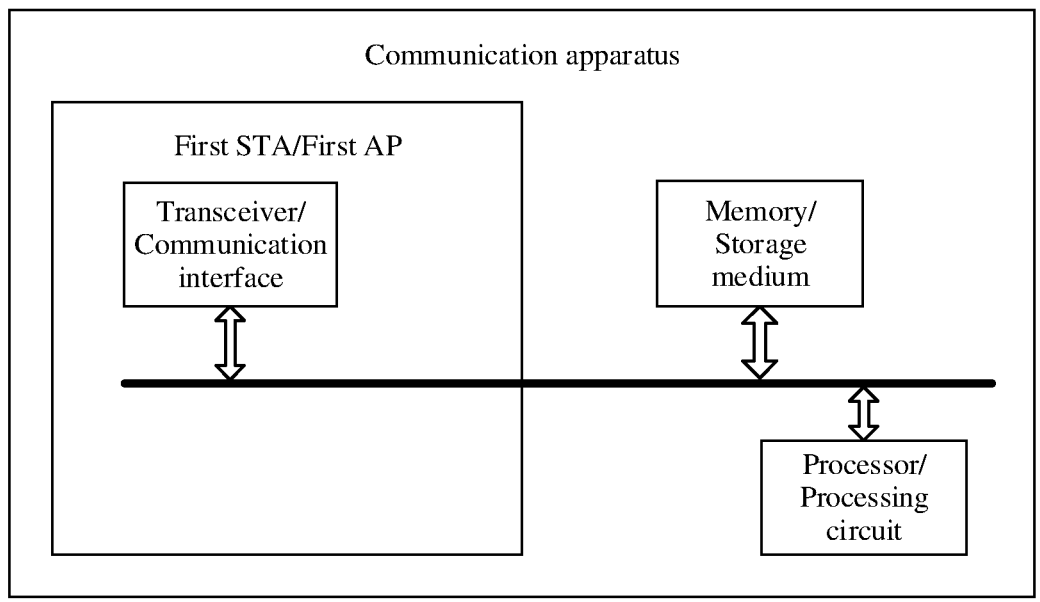
FIG. 15 is a schematic diagram of a structure of another communication apparatus according to an embodiment of this application.

FIG. 15 is a structural diagram of a possible product form of a communication apparatus according to an embodiment of this application. FIG. 15 is a specific form of the communication apparatus shown in FIG. 12 or FIG. 13.

In a possible product form, the communication apparatus may be an information transmission device/an information transmission board. The communication apparatus includes a processor and a transceiver. Optionally, the communication apparatus may further include a memory. The processor is configured to perform the method steps performed by the processing unit 22 in FIG. 12, and the transceiver is configured to perform the method steps performed by the transceiver unit 21 in FIG. 12. Alternatively, the processor is configured to perform the method steps performed by the processing unit 32 in FIG. 13, and the transceiver is configured to perform the method steps performed by the transceiver unit 31 in FIG. 13.

In another possible product form, the communication apparatus may be a chip. The communication apparatus includes a processing circuit and a communication interface. Optionally, the communication apparatus may further include a storage medium. The processing circuit is configured to perform the method steps performed by the processing unit 22 in FIG. 12, and the communication interface is configured to perform the method steps performed by the transceiver unit 21 in FIG. 12. Alternatively, the processing circuit is configured to perform the method steps performed by the processing unit 32 in FIG. 13, and the communication interface is configured to perform the method steps performed by the transceiver unit 31 in FIG. 13.

In another possible product form of the foregoing embodiment, the communication apparatus may alternatively be implemented by using the following: one or more field programmable gate arrays (FPGA), a programmable logic device (PLD), a controller, a state machine, a logic gate, a discrete hardware component, any other proper circuit, or any combination of circuits that can perform various functions described in this application.

The processor may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus may be a peripheral component interconnect (PCI) bus or an extended industry standard architecture (EISA) bus, or the like. The bus may be classified into an address bus, a data bus, a control bus, and the like. For ease of representation, only one bold line is used to represent the bus in FIG. 14 or FIG. 15, but this does not mean that there is only one bus or only one type of bus.

A person of ordinary skill in the art may understand that all or some of the steps of the method embodiments may be implemented by hardware relevant to program instructions. The program instructions may be stored in a computer-readable storage medium. When the program instructions are run, the steps of the method embodiments are performed. The foregoing storage medium includes any medium that can store program code, such as a USB flash drive, a removable hard disk, a ROM, a RAM, a magnetic disk, or an optical disc.

According to one aspect, an embodiment of this application further provides a readable storage medium. The readable storage medium stores computer-executable instructions. When the computer-executable instructions are run, a device (which may be a single-chip microcomputer, a chip, a controller, or the like) or a processor is enabled to perform the steps in the service indication method provided in this application.

According to one aspect, an embodiment of this application further provides a computer program product. The computer program product includes computer-executable instructions. The computer-executable instructions are stored in a computer-readable storage medium. At least one processor of a device may read the computer-executable instructions from the computer-readable storage medium. The at least one processor executes the computer-executable instructions, so that the device performs the steps in the service indication method provided in this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, division into the units is merely logical function division and may be another division during actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objective of the solutions of embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid state disk (SSD).

What is claimed is:

1. A method, wherein the method comprises:
   generating a first frame, wherein the first frame comprises indication information, the indication information indicates a padding duration required for a channel switch delay in an initial control frame, and the padding duration of the initial control frame is determined based on a duration of a control response frame responding to the initial control frame; and
   transmitting the first frame.

2. The method according to claim 1, wherein the indication information is carried in an enhanced multi-link multi-radio delay field of the first frame.

3. The method according to claim 1, further comprising:
   determining the duration of the control response frame.

4. The method according to claim 3, wherein determining the duration of the control response frame comprises:
   determining a rate of the control response frame; and
   determining the duration of the control response frame based on the rate of the control response frame and a length of the control response frame.

5. The method according to claim 4, wherein a maximum value of the rate of the control response frame is a highest rate that is in a basic service set basic rate set and that is less than or equal to a maximum rate of the initial control frame.

6. The method according to claim 5, wherein in response to the maximum rate of the initial control frame being 24 Mbps, the maximum value of the rate of the control response frame is a smaller value between 24 Mbps and the highest rate in the basic service set basic rate set.

7. The method according to claim 1, wherein the padding duration is associated with the channel switch delay, a first inter-frame space between the initial control frame and the control response frame, a second inter-frame space between the control response frame and a data frame, and the duration of the control response frame.

8. The method according to claim 1, wherein the padding duration is required in response to the initial control frame being transmitted at the maximum rate.

9. The method according to claim 1, wherein the padding duration is determined based on a minimum value of the duration of the control response frame.

10. The method according to claim 1, wherein the control response frame is a clear to send (CTS) frame, a format of the CTS frame is a non-high throughput (non-HT) format.

11. An apparatus, comprising:
    a processor; and
    a memory storing computer instructions, which when executed by the processor, cause the apparatus to:
    generate a first frame, wherein the first frame comprises indication information, the indication information indicates a padding duration required for a channel switch delay in an initial control frame, and the padding duration of the initial control frame is determined based on a duration of a control response frame responding to the initial control frame; and
    transmitting the first frame.

12. The apparatus according to claim 11, wherein the indication information is carried in an enhanced multi-link multi-radio delay field of the first frame.

13. The apparatus according to claim 11, wherein the computer instructions, when executed by the processor, further cause the apparatus to:
    determine the duration of the control response frame.

14. The apparatus according to claim 13, wherein the computer instructions, when executed by the processor, cause the apparatus to:
    determine a rate of the control response frame; and
    determine the duration of the control response frame based on the rate of the control response frame and a length of the control response frame.

15. The apparatus according to claim 14, wherein a maximum value of the rate of the control response frame is a highest rate that is in a basic service set basic rate set and that is less than or equal to a maximum rate of the initial control frame.

16. The apparatus according to claim 15, wherein in response to the maximum rate of the initial control frame being 24 Mbps, the maximum value of the rate of the control response frame is a smaller value between 24 Mbps and the highest rate in the basic service set basic rate set.

17. The apparatus according to claim 11, wherein the padding duration is associated with the channel switch delay, a first inter-frame space between the initial control frame and the control response frame, a second inter-frame space between the control response frame and a data frame, and the duration of the control response frame.

18. The apparatus according to claim 11, wherein the padding duration is required in response to the initial control frame being transmitted at the maximum rate.

19. The apparatus according to claim 11, wherein the duration of the control response frame is a minimum value of the duration of the control response frame.

20. The apparatus according to claim 11, wherein the control response frame is a clear to send (CTS) frame, a format of the CTS frame is a non-high throughput (non-HT) format.

21. The method of claim 1, wherein the first frame is generated and transmitted by a station (STA), and wherein the padding duration of the initial control frame is determined further based on the channel switch delay, a first inter-frame space between the initial control frame and the control response frame, and a second inter-frame space between the control response frame and a data frame.

* * * * *